United States Patent
Popa et al.

(10) Patent No.: US 9,472,093 B2
(45) Date of Patent: Oct. 18, 2016

(54) NEAR FIELD COMMUNICATIONS FOR UTILITY METERS

(71) Applicant: Itron, Inc., Liberty Lake, WA (US)

(72) Inventors: Daniel Popa, Paris (FR); Dhia Saleem, Clemson, SC (US); Vladimir Borisov, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 685 days.

(21) Appl. No.: 13/717,537

(22) Filed: Dec. 17, 2012

(65) Prior Publication Data

US 2014/0167978 A1    Jun. 19, 2014

(51) Int. Cl.
| | | |
|---|---|---|
| *G08B 23/00* | (2006.01) | |
| *G08C 17/02* | (2006.01) | |
| *G01D 4/00* | (2006.01) | |
| *H04W 4/00* | (2009.01) | |
| *H04L 29/12* | (2006.01) | |
| *H04W 28/06* | (2009.01) | |

(52) U.S. Cl.
CPC .............. *G08C 17/02* (2013.01); *G01D 4/006* (2013.01); *H04W 4/008* (2013.01); *H04L 61/2092* (2013.01); *H04L 61/6004* (2013.01); *H04L 61/6022* (2013.01); *H04L 61/6059* (2013.01); *H04L 61/6081* (2013.01); *H04W 28/065* (2013.01); *Y02B 90/243* (2013.01); *Y02B 90/246* (2013.01); *Y04S 20/325* (2013.01); *Y04S 20/42* (2013.01)

(58) Field of Classification Search
CPC ....................................... G01D 4/004
USPC ......................... 340/870.02, 572.1
See application file for complete search history.

(56) References Cited

U.S. PATENT DOCUMENTS

| | | | | |
|---|---|---|---|---|
| 3,747,068 | A * | 7/1973 | Bruner et al. ........... | 340/870.03 |
| 7,376,657 | B1 | 5/2008 | Mehta | |
| 2003/0051017 | A1* | 3/2003 | Choi ................... | H04L 29/1232 709/222 |
| 2005/0280511 | A1* | 12/2005 | Yokoyama et al. ......... | 340/10.5 |
| 2007/0159330 | A1* | 7/2007 | Chakraborty et al. ..... | 340/572.1 |
| 2007/0200729 | A1* | 8/2007 | Borleske et al. ........ | 340/870.02 |
| 2008/0068214 | A1* | 3/2008 | Garrison Stuber .... | G01D 4/006 340/870.02 |

(Continued)

FOREIGN PATENT DOCUMENTS

| | | |
|---|---|---|
| DE | 202011004327 | 9/2011 |
| DE | 202007019437 | 10/2012 |

OTHER PUBLICATIONS

"Enabling utility transactions with NFC", retrieved on Nov. 30, 2012 at <<http://www.eetasia.com/articleLogin.do?artId=8800678037&fromWhere=/ART_8800678037_499488_TA_6b93af33.HTM&catId=499488&newsType=TA&pageNo=null&encode=6b93af33>>, Global Sources, EETimesAsia, Nov. 22, 2012, 2 pages.

(Continued)

*Primary Examiner* — Benjamin C Lee
*Assistant Examiner* — Israel Daramola
(74) *Attorney, Agent, or Firm* — Lee & Hayes, PLLC

(57) ABSTRACT

Techniques for utilizing near field communications (NFC) with utility meters are described herein. In one example, a meter is configured for operation, either in a stand-alone or utility network capacity. The example meter may include a processor in communication with a memory device and a tag device configured for near field communication (NFC). In operation, the processor operates the tag device to read from the memory device to obtain data for transmission via NFC and/or write data obtained via NFC to the memory device.

16 Claims, 5 Drawing Sheets

(56) References Cited

U.S. PATENT DOCUMENTS

| | | |
|---|---|---|
| 2008/0186202 A1 | 8/2008 | Vaswani et al. |
| 2009/0072951 A1 | 3/2009 | Alberth, Jr. et al. |
| 2009/0115626 A1* | 5/2009 | Vaswani et al. ......... 340/870.02 |
| 2009/0287803 A1 | 11/2009 | McQuillan et al. |
| 2009/0300191 A1 | 12/2009 | Pace et al. |
| 2010/0253520 A1* | 10/2010 | Lauronen ................ H04L 67/12 340/572.1 |
| 2011/0070827 A1* | 3/2011 | Griffin et al. ................ 455/41.1 |
| 2011/0296169 A1 | 12/2011 | Palmer |
| 2012/0035989 A1 | 2/2012 | Abel et al. |
| 2012/0057581 A1* | 3/2012 | An .......................... H04W 8/02 370/338 |
| 2012/0079091 A1 | 3/2012 | Ermis et al. |
| 2012/0105249 A1 | 5/2012 | Bauerfeld et al. |
| 2012/0185932 A1 | 7/2012 | Stougaard et al. |
| 2012/0197806 A1 | 8/2012 | Hill |
| 2012/0218120 A1* | 8/2012 | Ree et al. ................ 340/870.02 |
| 2012/0239212 A1* | 9/2012 | Alexander et al. ........... 700/291 |

OTHER PUBLICATIONS

Krishnadas, "Freescale, Inside Secure announce secure utility meter reference design with NFC connectivity", retrieved on Nov. 30, 2012 at <<http://www.techonlineindia.com/article/12-01-25/freescale_inside_secure_announce_secure_utility_meter_reference_design_with_nfc_connectivity.aspx>>, TechOnline India, Jan. 25, 2012, 2 pages.

PCT Search Report and Written Opinion mailed Jan. 21, 2014 for PCT Application # PCT/US13/68227.

* cited by examiner

NEAR FIELD COMMUNICATIONS FOR UTILITY METERS

BACKGROUND

Utility meters used in the utility industry (e.g., the meters on houses and businesses measuring electricity, water or gas) may utilize a variety of systems and methods to transfer data into and out of the meters. One common system of communication with a utility meter involves the use of an optical port. However, data transfer rates via an optical port are limits. Moreover, the user of an optical port requires utility workers to repeatedly connect and disconnect. Water and natural gas meters provide additional design constraints, since these meters tend to be battery powered. Accordingly, communication with utility meters may be difficult.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
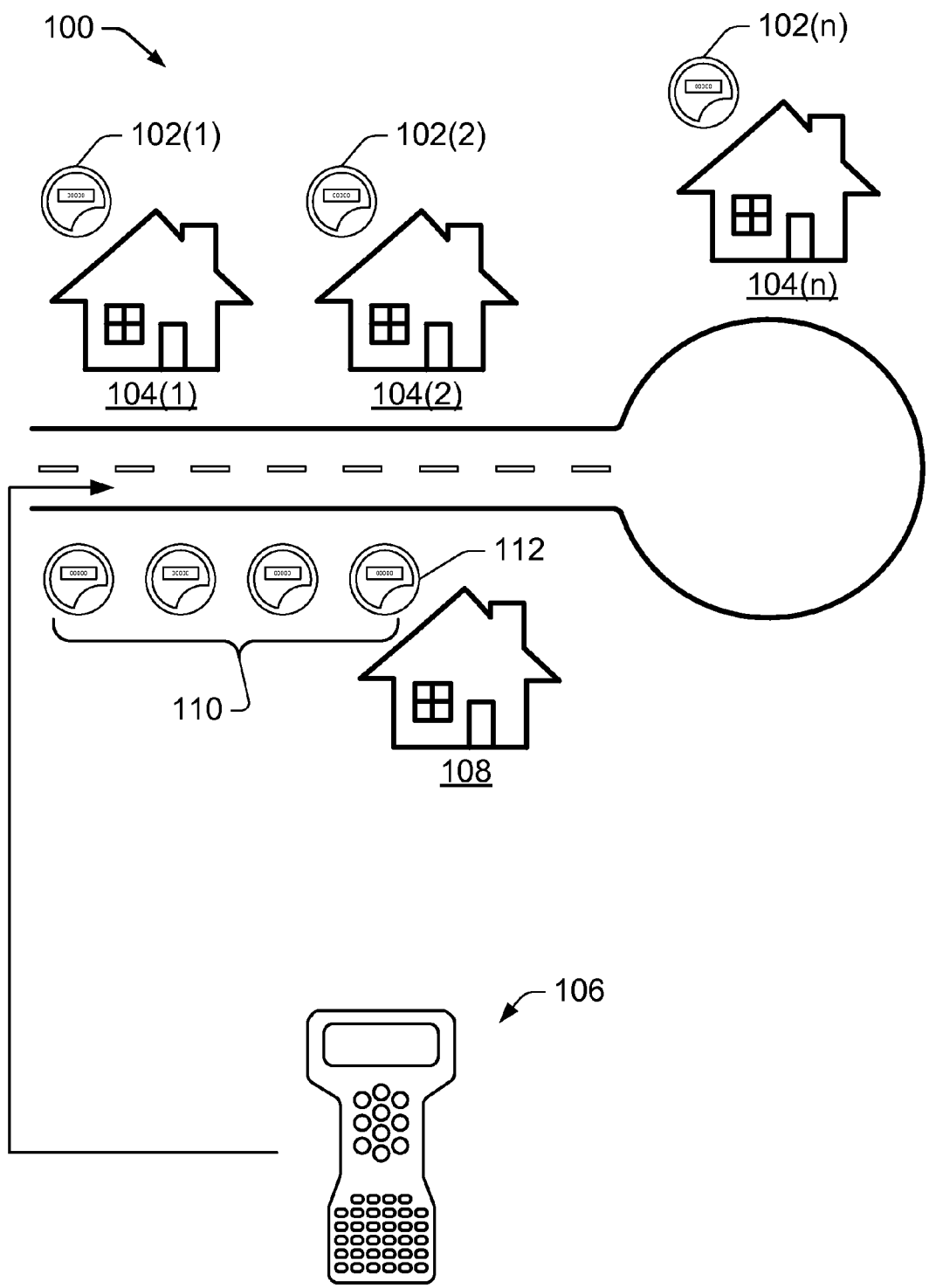
FIG. 1 is diagram illustrating example use of near field communications (NFC) with a handheld or mobile device in a utility meter environment.

As discussed above, existing modes of communication with a utility meter are slow and cumbersome. The disclosure describes techniques for providing near field communications (NFC) for use with utility meters. The disclosure includes a standard protocol architecture on top of NFCIP technology that extends a smart metering infrastructure. The disclosure provides for transporting IPv6 on top of NFC protocols, by using 6LowPAN as an adaptation layer between the NFCIP data link layer and IPv6 layers. This disclosure provides a mechanism to adapt the 6LowPAN/IPv6 to NCFIP link-layer characteristics, such as link-layer frame payload limits of 255 octets, link-layer address sizes of 10 octets, etc.

In one example, a mobile (e.g., handheld) unit is used to establish NFC with one or more meters. With NFC established, the handheld unit is able to engage the meter with a series of commands, responses, software and/or data transfer, etc. These activities may assist in network configuration and/or network management, push configuration data, assist a utility meter/network node in the process of network discovery and attachment or other functions. In the example, commands may determine a meter type, software and/or firmware version(s), or other conditions. The handheld unit may send/download data (e.g., a software or firmware update and/or configuration files/data) to the meter. The handheld unit may receive/upload data (e.g., consumption information) from the meter.

In a second example, NFC may be used to allow a group or block of meters to communicate with a primary meter. The primary meter may create and/or maintain an instance of a virtual meter in its memory corresponding to each of the other meters in the block of meters. The virtual meter may be used to record consumption data associated with the other meters. In such an example, each of the other meters may be configured without a user interface (e.g., a display, LED, LCD, etc.), without networking systems, and/or without connectivity except for an NFC connection to the primary meter. In operation, the primary meter is able to utilize the virtual meters associated with each of the other meters to maintain and report consumption data to a head office or other network communication device.

The discussion herein includes several sections. Each section is intended to be an example of techniques and/or structures, but is not intended to indicate elements which must be used and/or performed. A first section, entitled "Example Near Field Communication (NFC) Environment" illustrates an example environment wherein NFC may be used to: provide meters with firmware/software updates, gather consumption data, manage or set up configuration or management, and other functionality. An example of a virtual meter configuration is also shown, wherein a primary meter in NFC with each meter in a block of meters may act as a virtual meter or representative of another meter in communications with a central office. A second section, entitled "Example Meter and Mobile Unit Construction for NFC" illustrates example construction of a meter and a handheld unit. Both hardware and software structures are shown. A third section, entitled "Example Timing and Flow Protocol" illustrates example operation of a handheld unit and either an electric, gas or water meter. A section entitled "Example Methods" discusses aspects of methods operational in devices including processors, memory devices, application specific integrated circuits (ASICs), etc. In particular, the example methods may be applied to any of the techniques discussed herein, including those of the following sections. This brief introduction is provided for the reader's convenience and is not intended to describe and/or limit the scope of the claims or any section of this disclosure.

Example Near Field Communication (NFC) Environment

FIG. 1 is diagram illustrating example use of near field communications (NFC) with a handheld or mobile device in a utility meter environment 100. In the example shown, a plurality of utility meters 102(1), 102(2) . . . 102(n) are associated with a plurality customers 104(1), 104(2) . . . 104(n), respectively. The meters 104 may be configured in a networked environment, such as a star network, a mesh network or other network configuration. In such an environment, the meters 104 may be considered to be nodes in the network. Alternatively, each meter 102 may be a stand-alone or unconnected metering device within the utility meter environment 100. In that case, the individual meters may be configured for automatic meter reading (AMR) operation, in which reads are by mobile or handheld meter reading device.

A handheld device 106 is representative of portable and mobile devices generally, and is configured for NFC with the meters 102. In operation, the handheld device 106 may be manually positioned in a location adjacent to a meter 102 to establish NFC. Using NFC, the handheld device 106 communicates with the adjacent meter for one or more purposes.

Example purposes include: providing the meter with a firmware and/or software update, obtaining consumption information (e.g., kilowatt usage) from the meter, exchange of network configuration information, exchange of commands and/or queries, push of configuration data to assist the meter on the process of network discovery and attachment to a network (particularly critical for gas and/or water meters or other battery powered devices), logging reads of the meter, etc. Thus, by manually positioning the handheld device next to a meter, NFC is established with each meter. Appropriate exchange of software, firmware, data, commands and queries, etc., may take place during the NFC session. The handheld device 106 may then be located adjacent to another meter 102 and another NFC session established.

In a second example of NFC, an apartment house 108, cluster of businesses or other utility customers may include a block or plurality of clustered meters 110. The block of meters 110 may be part of a utility network. Alternatively, the cluster may stand alone in a non-networked configuration. Each meter in the block 110 of meters may include a processor, memory device and metrology circuitry. Each meter in the block of meters 110 may be in NFC with a primary utility meter 112 from among the block. The primary utility meter 112 may create and/or maintain a virtual meter associated with each of the plurality of utility meters 110. The primary meter 112 may be the same or different than other meters in the block. In some example, primary meter 112 may not have actual metering functionality, but may instead manage the virtual meter functionality of other meters in the block of meters. Each virtual meter, defined in the primary meter 112, may include metrology information obtained from an associated one of the plurality of meters 110. The meters 110 may simply be metrology sensor(s) in communication via NFC with the primary meter 112. The information from each meter 110 may be obtained by operation of NFC.

Example Meter and Mobile Unit Construction

Figure 2:
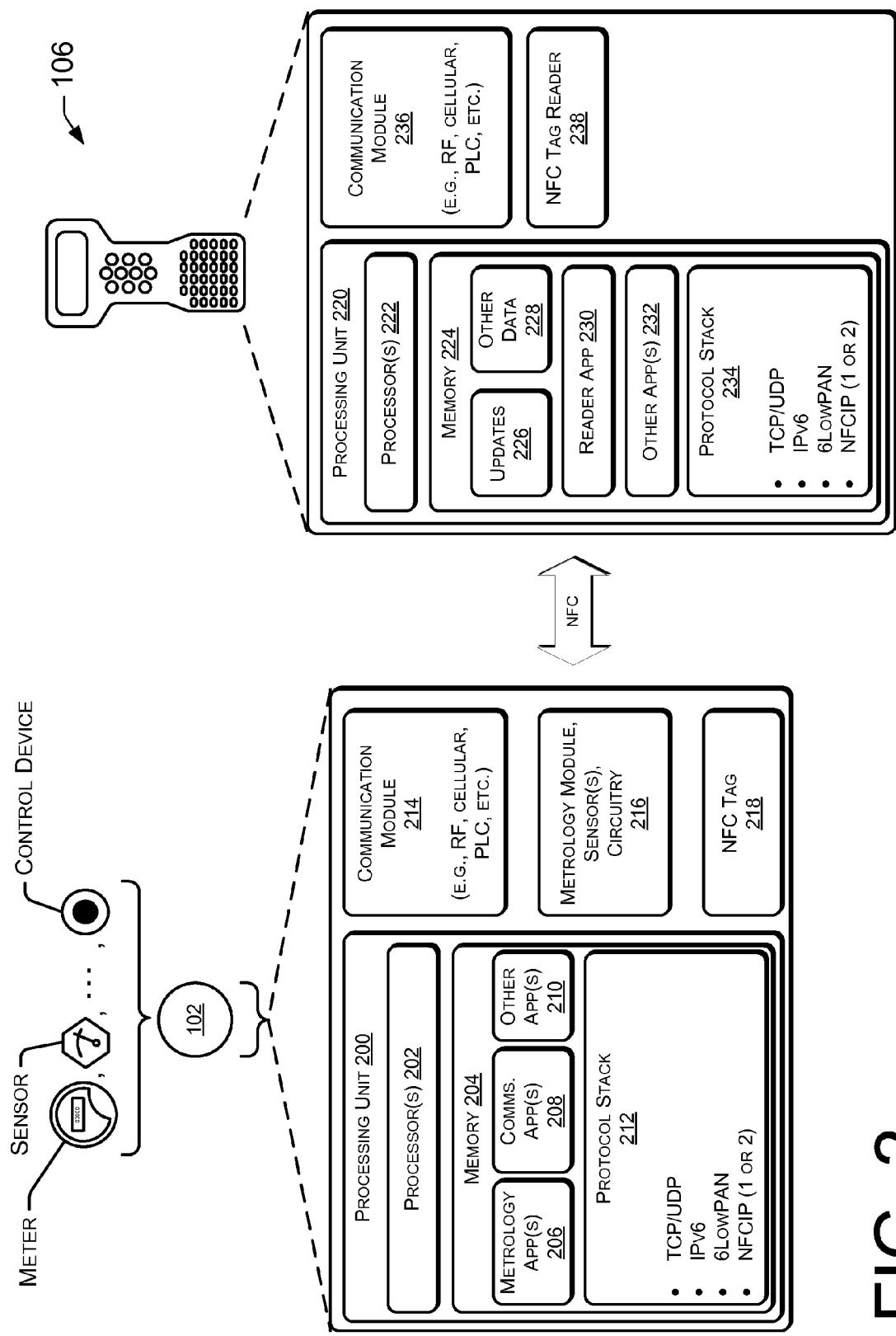
FIG. 2 is a block diagram showing example detail of a utility meter and a handheld unit, both configured for NFC.

FIG. 2 is a block diagram showing example detail of a network node or utility meter 102 and a handheld unit 106, both configured for near field communications (NFC). The meter 102 may be configured for measurement and recording of data related to the consumption of electricity, gas or water, etc. The utility meter 102 may include a processing unit 200, which may include a processor 202 in communication with a memory device 204. The memory device 204 may include one or more metrology applications 206, which may be configured to operate a metrology and sensor module 216 and to obtain meter data. Examples of other applications 210 may include those required for device management or other purposes.

During communication over any media, such as during an NFC session, the meter 102 may utilize a protocol stack 212 to perform required functionality, including for example, packet formation, protocol recognition, data formats, redundancy, etc. In another example, 6LowPan may be used as an adaptation layer that supports header compression and segmentation and reassembly to fit an IPv6 minimum MTU of 1280 octets into a NDCIP maximum MTU of 255 octets. In the example of FIG. 2, the protocol stack 212 may include a Transmission Control Protocol/User Datagram Protocol (TCP/UDP) layer. This protocol layer may operate on top of a protocol such as Internet Protocol version 6 (IPv6). In turn, this protocol layer may run on top of a protocol such as Low Power Wireless Personal Area Networks (6LowPAN). In turn, this protocol may run on top of a protocol such as Near Field Communication Internet Protocol (NFCIP). The example shown is meant to be representative of protocols that may be used during operation of NFC.

A communications module 214 may include hardware to communicate with other network nodes, such as meters, relays, switches, the central office, etc. The communications module 214 may include one or more of radio frequency (RF) equipment, cellular phone-type radio equipment, power line communication (PLC) equipment, etc. A metrology module 216 may include sensors, circuits and other devices to measure the flow and/or quantity of electricity, natural gas, water or other consumable product.

An NFC tag 218 may be configured for operation as a target, during NFC communication. The NFC tag 218 may be configured for operation in an active communications mode or a passive communications mode. In the active mode, the NFC tag 218 is powered. In the passive mode, the NFC tag is powered only by energy provided by an initiator device (e.g., a handheld device) and only when that device is in close proximity. In active mode, the tag is always on. The NFC tag may allow communications with the handheld unit 106, if and when that unit is in proximity to the meter 102.

The handheld unit 106 may include a processing unit 220, which may include a processor 222 in communication with a memory device 224. The memory 224 may include a number of programs/applications and data, etc. Representative examples of programs/applications may include update(s) 226, which may include firmware, software or other updates to be downloaded to the meter 102. Other data 228 may include data to be downloaded to, or uploaded from, one or more meters 102. Examples of downloadable data may include network configuration data, while examples of up-loadable data may include consumption data from one or more meters 102. A reader application 230 may be executed to operate an NFC tag reader 238, in the course of establishing and operating an NFC session. Other applications 232 may be operable for any number of tasks, such as assisting a meter in joining a network, transferring data, performing meter or handheld diagnostics, etc.

A protocol stack 234 may be present, and may be operable during communication with a meter, the central office or other device. The protocol stack 234 may be used in conjunction with any communication mode, such as NFC, RF communication, cellular, PLC, etc. The protocol stack 234 may be similar to the protocol stack 212 of the meter 102.

The NFC tag reader 238 may be controlled by the NFC tag reader application 230. The NFC tag reader 238 may communicate with the NFC tag 218 of the meter 102. The NFC reader application 230 may control aspects of the NFC tag reader 238 during such communications.

In operation, the handheld unit 106 may play the role of initiator, while the meter 102 plays the role of target device. In this example, these roles may be fixed, regardless of whether the meter is in an active or passive mode. The handheld device may have a user configuration option allowing selection of the mode of communication. For example, communication with mainline powered devices or communication with battery powered devices (i.e., communication with an electric meter, or communication with a gas/water meter). Alternatively, the handheld device may be configured to dynamically discover a type of meter it is communicating with (an electric meter vs. a gas or water meter) during an initialization phase. The initialization phase may be performed when the handheld device (the initiator) initializes the communication with the target device (the meter), or during a data exchange protocol set-up.

As indicated with respect to FIG. 1, the meter 112 may be the primary utility meter of a block or cluster of meters 110. In that role, the primary 112 may include a tag reader and/or tag reader application. Accordingly, the primary 112 may operate in a manner similar to the handheld unit 106, in that the primary may establish NFC with other members of the block of meters 110. In that environment, the primary 112 may assume a role as an initiator, while the other meter may assume the role as target, either in an active or inactive mode.

Example Timing and Flow Protocol

While a number of network protocols and technologies are described herein, they are merely illustrative. In some circumstances, other communication protocols may be used, substituted or developed. In one example, NFC technology does not define the application (next higher layer) to be used on top of the NFC data link layer protocol. It only provides a reliable way of transporting upper layer data-grams between two devices in close proximity. The data link layer protocol defined for the NFC technology allows establishment of point-to-point and point-to-multipoint communications between NFC-equipped devices, as well as some basic functionalities to configure and/or negotiate some of the data link protocol parameters, such as data rate, as well as to a STOP-AND-WAIT flow control protocol (ACK/NACK). From a functional perspective this is similar to a point-to-point protocol.

Additionally, 6LowPAN compression was defined in the context of a 802.15.4 link-layer. Standard 802.15.4 supports a link-layer (MAC) address sizes of 8-, 16- or European University Institute (EUI) 64-bits. Any of the MAC addresses less than 64-bits, can be extended to a 64-bit EUI-like address.

The NFCIP defines link-layer addresses of 10 octets, that are randomly and locally, generated by each device. The addresses last the time of the communication (between Initiator and Target devices). Addresses generated when the Initiator initiates the communication with the Target are erased when the Initiator terminates the communication with the Target device. The next time that the same Initiator and Target devices communicate they generate new addresses.

In order to present to the 6LowPAN layer a NFCIP link-layer with address lengths equivalent to the 802.15.4 address lengths, the following approach may be utilized. For a 64-bit link-layer address, the first 2 octets of the NFCIP link-layer are always set to zero. The remaining 8 octets (64 bits) are randomly generated, as indicated by Table 1.

TABLE 1

| Field name | NFCIP link layer address | |
|---|---|---|
| Size (octets) | 2 | 8 |
| Value | 0x00 | Random |

For a 16-bit link-layer address, the first 8 octets of the NFCIP link-layer are set to zero. The remaining 2 octets (16 bits) are randomly generated, as indicated by Table 2.

TABLE 2

| Field name | NFCIP link layer address | |
|---|---|---|
| Size (octets) | 8 | 2 |
| Value | 0x00 | Random |

For an 8-bit link-layer address, the first 9 octets of the NFCIP link-layer are set to zero. The remaining 1 octet (8 bits) is randomly generated as indicated by Table 3.

TABLE 3

| Field name | NFCIP link layer address | |
|---|---|---|
| Size (octets) | 9 | 1 |
| Value | 0x00 | Random |

When the NFCIP link-layer presents its address to the 6LowPAN layer, the first (2, 8 or 9) octets set to zero will be elided. This allows the 6LowPAN layer to be "hidden," by using a non-802.15.4 MAC layer. In one example, the 6LowPan layer has been designed to adapt IPv6 to 802.15.4 link-layer. The 6lowpan layer allows compression of the IPv6 addresses that embed a MAC layer address into an IPv6 address, which is the case for link-local IPv6 addresses. Since NFCIP defines a size of 10 octets (as shown in Table1) and for stateless auto-configuring link-local IPv6 address we need an 8 octets EUI (or EUI-like) MAC address, the approach of the example is to have the NFCIP set a link-layer address as follows: the first x octets are set to 0x00 and the last (10-x) octets are randomly computed (generate a random number on (10-x) octets), where x=2, 8 or 9 octets. In these circumstances, NFCIP has a 10-octet link layer address, 802.15.4 MAC address has up to 1/2/8 octets, IPv6 requires an 8 octets link-layer/MAC address to configure a link-local IPv6 address. In the example IPv6 layer is presented with a NFCIP link-layer address compressed down to 8/2/1 octets from 10 octets, that is first 2/8/9 octets are set to zero and can be compressed (and/or elided).

Stateless auto-configuration of the IPv6 link-local address requires that a device use its 64-bit EUI MAC address to configure a link-local IPv6 address. In this circumstance, the NCFIP link-layer presents to the IPv6 layer a randomly generated address with the first 2 two "zero" octets elided (see Table 1 above). The resulting IPv6 link-local address is shown in Table 4.

TABLE 4

| | IPv6 link-local address | |
|---|---|---|
| Field name | Prefix | EUI 64-bit link-layer address |
| Size (octets) | 8 | 8 last bits from the NFCIP link-layer address |
| Value | N/A | Random (from 1 above) |

Figure 3:
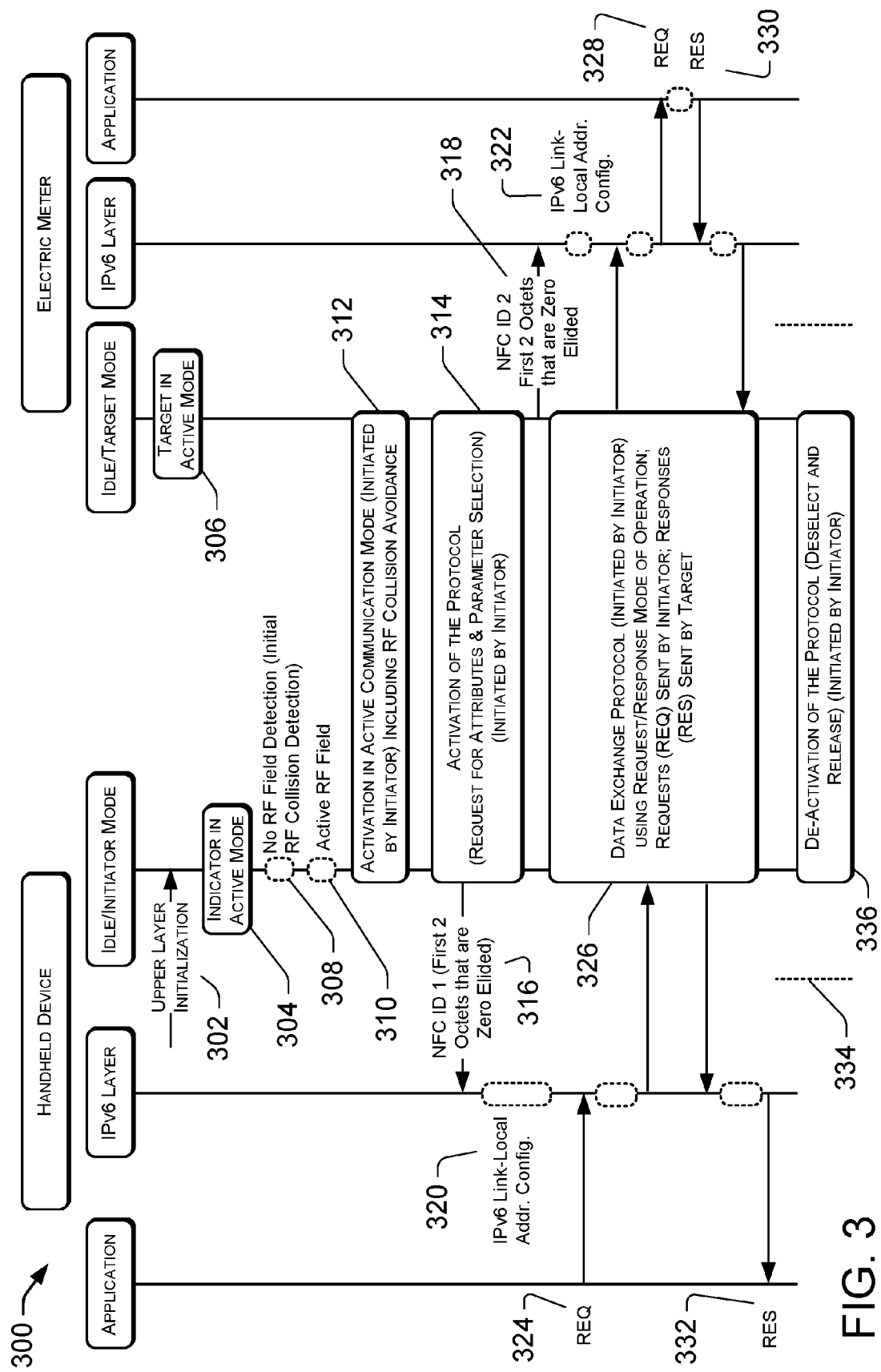
FIG. 3 is timing and flow protocol diagram showing example operation of a handheld unit and an electric meter.

FIG. 3 is timing and flow protocol diagram showing example operation 300 of a handheld unit and an electric meter. At operation 302, upper level initialization is performed by the handheld device (e.g., handheld device of 106 of FIGS. 1 and 2). At operation 304, the handheld device is configured as an initiator in an active mode. At operation 306, the electric meter (e.g., electric meter 102 of FIGS. 1 and 2) may be configured as a target in active mode. At operation 308, a lack of RF field detection is verified. In response, at operation 310, the RF field is activated. At operation 312, an active communication mode is activated, including RF collision avoidance. The activation is initiated by the initiator, i.e., the handheld device. At operation 314, the NFC protocol is activated. In one example, the initiator makes a request for attributes and parameter selection. At operations 316 and 318 a NFC message is sent to the IPv6 layer of the handheld device and the electric meter. The message indicates ID1 to the handheld device and ID2 to the electric meter. In both operations, the first 2 octets that are zero are elided (removed). At operations 320 and 322, the IPv6 link does a local address configuration. At operation 322, an application on the handheld creates a request directed to the electric meter. At operation 326, a data exchange protocol is initiated by the initiator (i.e., the handheld) using a request/response mode of operation. The requests (REQ) are sent by the initiator, while the responses (RES) are sent by the target. The REQ and RES include a payload of information to be conveyed. At operation 328 the request is received by an application operating on the electric meter. At operation 330, a response is generated. As seen in operation 326, the data exchange protocol is initiated, and at operation 332 the response is received by the application running on the handheld device. Thus, in the illustrated example, the request made at operation 324 resulted in the response received at operation 332. At operation 334, the cycle of request by the handheld and response by the electric meter may be repeated. At operation 336, at the conclusion of the session, the protocol may be de-activated. In particular, a deselect and release is initiated by the initiator (i.e., the handheld).

Figure 4:
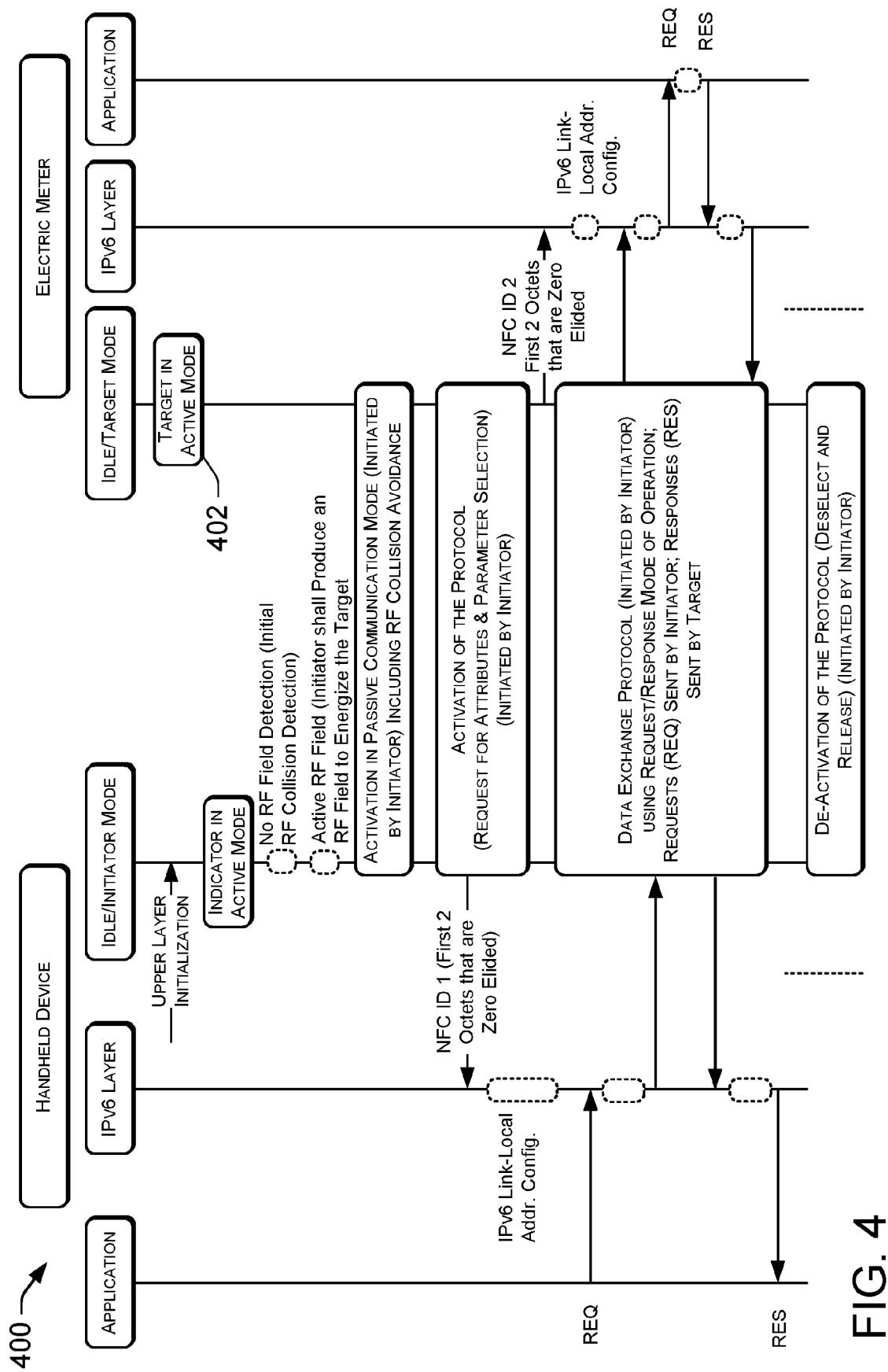
FIG. 4 is timing and flow protocol diagram showing example operation of a handheld unit and a gas meter, a water meter or other battery powered meter.

FIG. 4 is timing and flow protocol diagram showing example operation 400 of a handheld unit and a gas meter, water meter or other battery powered meter. FIG. 4 differs from FIG. 3 in that at operation 402 the target is in passive mode. Passive mode is consistent with the need of battery powered metering units to conserve power.

Example Methods

Figure 5:
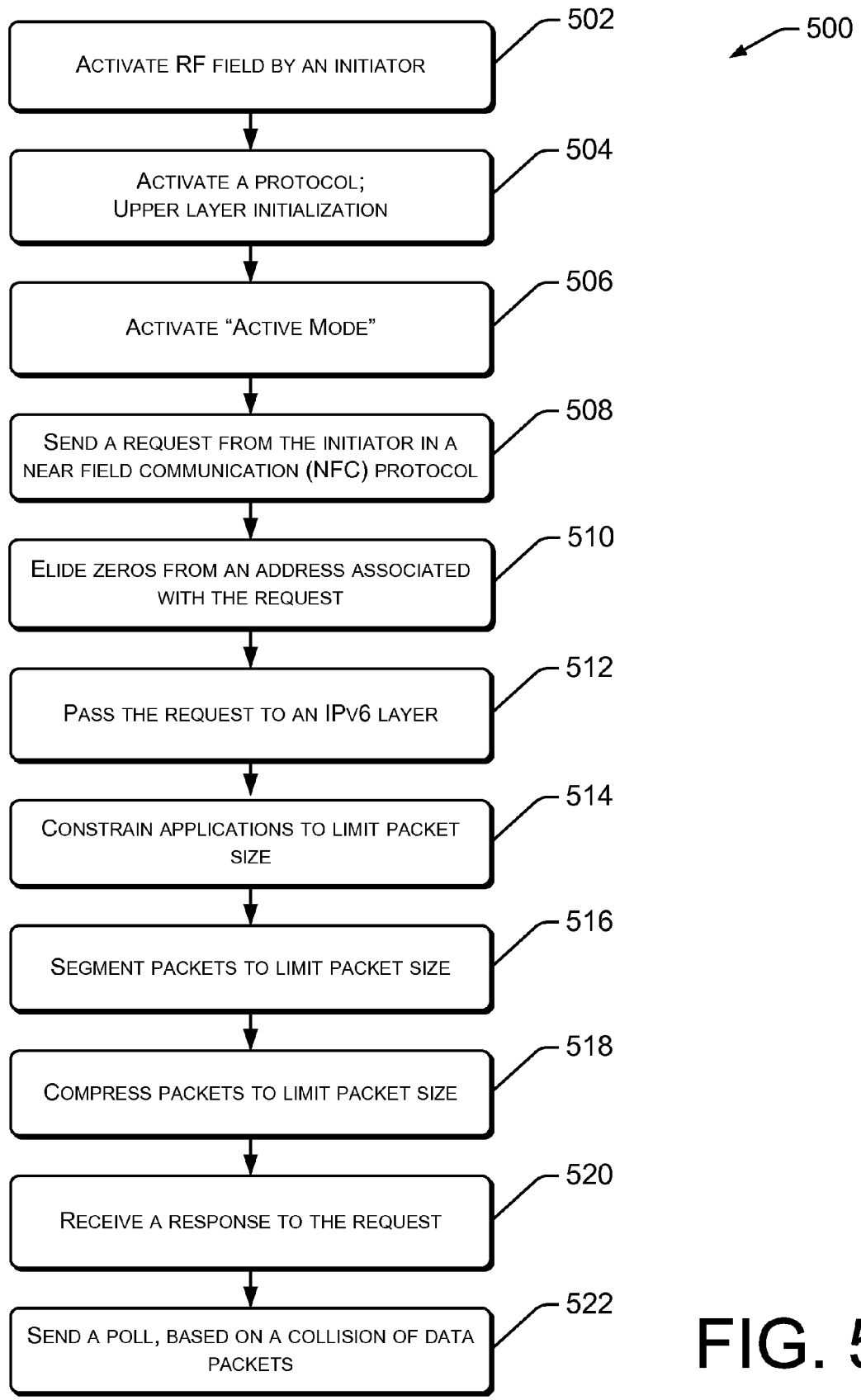
FIG. 5 is a flow diagram showing an example method utilizing NFC in the context of a utility meter environment.

FIG. 5 is a flow diagram showing an example method 500 for utilizing NFC in the context of a utility meter environment. The operations of the method may be performed by computer- or processor-executable steps or operations defined on a computer and/or processor-readable storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include such non-transitory communications media.

In one example, several initial steps may be taken. At operation 502, an RF field is activated in response to an initiator. In the example of FIGS. 3 and 4, the initiator is the handheld device. At operation 504, an NFC protocol is activated in response to the initiator and upper layers of the protocol are initialized. At operation 506, an active communication mode is started in the initiator and in the target, if the target is an electric meter. If the target is a gas meter, water meter or battery powered device, a passive mode is started.

The initiator (e.g., the handheld device) may send a request to the target device (e.g., an electric meter). At operation 508, a request is sent from an application running on the initiator. The NFC protocol may be used for the transmission. At operation 510, zeros may be elided from an address associated with the request. Removal of the zeros reconciles differences address configurations expected by different layers of protocols. At operation 512, the request is passed to an IPv6 layer in the target. The request may be received by an application running on the target.

The NFCIP Data Link (DL) layer technology supports up to 255 octets into a DL frame payload, which is smaller than what is required to transport an IPv6 MTU of 1280 octets. Accordingly, a frame format for transmission of IPv6 packets may be defined to overcome this discrepancy. Additionally, the formation of IPv6 link-local addresses, and the stateless auto-configuration of addresses on top of NFCIP interfaces, is defined. In one example, IPv6 requires support of packet sizes of 1280 octets, which is much larger than the largest NFCIP frame payload size of 255 octets. To overcome this discrepancy, 6LOWPAN compression and segmentation and re-assembly mechanisms may be used. Alternatively, the applications using NFCIP communication channel can be configured to always generate application protocol data units that will lead to IPv6 packets (+6Low-PAN headers) having a size of up to 255 octets.

At operation 514, applications may constrain (or be compelled to restrain) packet size, to avoid the limit. Additionally or alternatively, at operation 516, packets may be segmented to reduce packet size to a required size. Additionally or alternatively, at operation 518, packets may be compressed to reduce packet size to a required size.

At operation 520, a response to the request (made by the initiator at operation 508) may be received by the initiator. At operation 522, if the response is not received (e.g., due to collision of packets), a poll is sent by the initiator to the target.

CONCLUSION

Although the subject matter has been described in language specific to structural features and/or methodological acts, it is to be understood that the subject matter defined in the appended claims is not necessarily limited to the specific features or acts described. For example, while NFC tags have been discussed herein, similar results could in some cases be obtained by use of other NFC technologies, current and future. Rather, the specific features and acts are disclosed as exemplary forms of implementing the claims.

What is claimed is:

1. A utility meter, comprising:
   a processor;
   a memory device, in communication with the processor; and
   an NFC (near field communication) tag device to communicate using NFC, wherein the utility meter is configured for communication with an NFC tag reader using NFC by:
   utilizing a Near Field Communication Internet Protocol (NFCIP) data link-layer to format data including utility meter reading data for transmission by NFC; and
   adapting an Internet Protocol version 6 (IPv6) layer to an 802.15.4 link-layer by a Low Power Wireless Personal Area Networks version 6 (6LowPAN) layer to provide link-layer frame payload limits and link-layer address sizes, and to transport the IPv6 layer on top of the NFCIP link-layer by using the 6LowPAN layer between the NFCIP data link-layer and the IPv6 layer, the adapting comprising:
setting a number of octets in an NFCIP data link-layer address to zero, and
setting each of a remaining number of octets in the NFCIP data link-layer address to a randomly generated value, so that the NFCIP data link-layer address is compressed down to an address length of a 802.15.4 link-layer address length;
wherein operation of the processor operates the NFC tag device to:
read from the memory device to obtain data including utility meter reading data for transmission via NFC to the NFC tag reader; and
selectively write data obtained from the NFC tag reader via NFC to the memory device.

2. The utility meter as recited in claim 1, wherein: operation of the processor writes a firmware update to the memory device; and the firmware update was obtained through the NFC tag device using NFC.

3. The utility meter as recited in claim. 1, additionally comprising:
metrology circuitry to measure electric current and/or electric power consumption;
wherein the NFC tag device is active and the utility meter is utilized as a target device.

4. The utility meter as recited in claim 1, additionally comprising:
metrology circuitry to measure gas or water consumption; and
battery power to power the metrology circuitry.

5. The utility meter as recited in claim 1, wherein: the 6LowPAN layer reconciles differences in supported packet size among layers by compressing data or segmenting data.

6. The utility meter as recited in claim 1, wherein: applications executed by the processor and using NFCIP packets are constrained to limit a size of Ipv6 packets and 6LowPAN headers to at most 255 octets.

7. The utility meter as recited in claim 1, further comprising a metering application, stored in memory and executable by the processor, wherein:
the metering application is operable on top of Transmission Control Protocol/User Datagram Protocol (TCP/UDP), TCP/UDP runs on top of Ipv6;
Ipv6 runs on top of 6LowPAN; and
6LowPAN runs on top of NFCIP, wherein 6LowPAN reconciles differences in packet size between Ipv6 and NFCIP.

8. The utility meter as recited in claim 1, wherein applications executed on the utility meter are limited to packet sizes of at most a least size prescribed by any software or any firmware layer.

9. The utility meter as recited in claim 1, wherein communication using NFC comprises:
presenting an NFCIP link-layer address to the 6LowPAN layer; and
eliding a number of octets of zeros from the NFCIP link-layer address, wherein the number of octets of zeros elided is based on a length of the NFCIP link-layer address.

10. A block of meters, comprising:
a plurality of utility meters, wherein each utility meter in the plurality of utility meters comprises:
the utility meter recited in claim 1; and
metrology circuitry in communication with the processor; and a primary utility meter, in NFC with each of the plurality of utility meters, to maintain a virtual meter associated with each of the plurality of utility meters, each virtual meter to include metrology information obtained from one of the plurality of utility meters over NFC.

11. A unit to communicate with a utility meter, comprising:
a processor;
a memory device, in communication with the processor;
a tag reader device, to communicate using near field communication (NFC) with a tag device of the utility meter, configured as an active device and to play a role of initiator of NFC communication with the tag device, wherein the communication uses near field communication Internet Protocol (NFCIP) that comprises constraining applications executed by the processor and using NFCIP packets to limit Internet Protocol version 6 (IPv6) layer packets and Low power Wireless Personal Area Networks version 6 (6LowPAN) later headers;
wherein the processor operates the tag reader device to:
read from the memory device to obtain data for transmission to the tag device via NFC; and
selectively write to the memory data including utility meter reading data obtained from the tag device via NFC;
wherein the tag reader device is configured for communication with the tag device using NFC by:
utilizing the Near Field Communication Internet Protocol (NFCIP) layer to format data for transmission by NFC; and
adapting the IPv6 layer to 802.15.4 link-layer by the 6LowPan layer to provide link-layer frame payload limits and link-layer address sizes, and to transport IPv6 layer on top of the NFCIP layer by using a 6LowPAN layer between the NFCIP data link-layer and the Ipv6 layer, comprising:
setting a number of octets in an NFCIP link layer address to zero, and
setting each of a remaining number of octets in the NFCIP link-layer address to a randomly generated value, so that the INFCIP link-layer address is compressed down to an address length of an 802.15.4 link-layer address length.

12. The unit as recited in claim 11, wherein the processor operates the tag device to:
provide network configuration management information to a utility meter on a network.

13. The unit as recited in claim 11, wherein the communication using NFC comprises:
operating of a plurality of protocol layers; and
adjusting of an address in one layer of the protocol layers to conform to requirements in another layer of the protocol layers.

14. A method to perform near field communications (NFC) from an NFC tag initiator, comprising:
activating an RF field by the NFC tag initiator;
activating NFC protocol;
sending a request using the NFC protocol and the RF field to an NFC tag for information response, by:
utilizing a Near Field Communication Internet Protocol (NFCIP) layer to format the request for transmission to the NFC tag by NFC;
adapting an Internet Protocol version 6 (Ipv6) layer to 802.15.4 link-layer by a Low Power Wireless Personal Area Networks Version 6 (6LowPan) layer to provide link-layer frame payload limits and link-layer address sizes, and to transport the Ipv6 layer on top of the Near Field Communication (NFC) protocol of the request by using the 6LowPAN layer between the NFCIP layer and the Ipv6 layer, comprising:

eliding zeros in an address associated with the request by setting a number of octets in an NFCIP link-layer address to zero; and setting each of a remaining number of octets in the NFCIP link-layer address to a randomly generated value, so that the NFCIP link-layer address is compressed down to an address length of a 802.15.4 link-layer address length; and receiving a response to the request from the NFC tag that is in communication with the Ipv6 layer.

15. The method of claim 14, wherein sending the request comprises:

constraining applications to limit packets, sent in response to the request, to 255 octets or less; or segmenting or compressing packets in the response, sent in response to the request, to 255 octets or less.

16. The method of claim 14, additionally comprising:

activating active mode in a metering device in response to the NFC tag initiator; and sending to a poll from the NFC tag initiator in response to a collision of data packets.

* * * * *